Patented Dec. 26, 1950

2,535,635

UNITED STATES PATENT OFFICE 2,535,635

SUBSTITUTED PYRIMIDINES AND PREPARATION OF THE SAME

Martin E. Hultquist, Bound Brook, N. J., and Yellapragada SubbaRow, Pearl River, N. Y.; Aloysius J. Bryant, administrator of said SubbaRow, deceased, assignors to American Cyanamid Company, New York, N. Y., a corporation of Maine No Drawing. Application August 3, 1948, Serial No. 42,343

12 Claims. (Cl. 260—256.5)

This invention relates to new and useful sulfonamides and to methods of preparing the same.

This application is a continuation-in-part of application Serial Number 25,524, filed May 6, 1948, entitled Hydroxysulfonamides and Preparation of the Same.

We have discovered that certain p-hydroxybenzenesulfonamido pyrimidines, having substituents on the pyrimidine nucleus, possess unexpected anti-viral activity, particularly against the viruses causing poliomyelitis and equine encephalitis and may, therefore, become important drugs in the treatment of these and other viral diseases. The new compounds of the present invention may be represented by the general formula

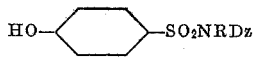

in which $D_z$ represents a pyrimidyl radical having one or more substituents thereon, and R represents hydrogen or an aliphatic, aralkyl, or heterocyclic radical attached to the amide nitrogen atom. The pyrimidyl radical may be attached to the amide nitrogen through any one of the carbon atoms in the pyrimidine ring. The pyrimidyl radical is further substituted by one or more substituent radicals such as alkyl, aryl, alkoxy, hydroxy, hydroxyalkyl, carboxy, halo, carbalkoxy, amino and the like. Substituents on the pyrimidyl radical may also form a fused ring system forming quinazolyl, tetrahydroquinazolyl, pteridyl radicals, and the like.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased and they are therefore valuable for parenteral use. Obviously, such salts are included within the scope of the present invention.

The new p-hydroxybenzenesulfonamidopyrimidines may be prepared by several distinct methods, the more important of which will be described in the specific examples which follow. The preferred method is by the hydrolysis of a suitable ester of a p-hydroxybenzenesulfonamidopyrimidine under either acidic or alkaline conditions whereby the —OH group is formed in the reaction. These esters which have the general formula

R' being an acyl radical, are believed to be new and are intended by us to be included within the scope of the invention. These are not only valuable as intermediates to produce the p-hydroxybenzenesulfonamidopyrimidines, but are valuable per se as drugs in that they may be slowly hydrolyzed in the system.

To prepare the new acyl compounds of the present invention several methods are available. A preferred method involves the condensation of an appropriate benzene sulfonyl halide with a substituted aminopyrimidine in accordance with the following equation:

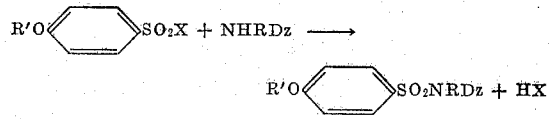

In the above R' is an acyl radical such as benzoyl, acetyl, furoyl, tosyl, carbethoxy or the like. X is a halogen, preferably chlorine, but if desired fluorine, bromine or iodine. Dz is a pyrimidyl radical as defined above in which the amino group is attached to a carbon atom in the pyrimidine ring.

To prepare intermediates in which R is an organic radical of the kind mentioned above, secondary amines such as 2-N-benzylamino-4-methyl pyrimidine, 2 - N - methylamino - 4,6-dimethoxy pyrimidine and the like are employed in the reaction.

A preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O— to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and a slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O— to HO— can also be effected by hydrolysis under acidic conditions using hydrochloric acid, sulfuric acid, or other known acid hydrolyzing agents.

The time for completion of the hydrolysis depends on several factors including the temperature, the concentration of the hydrolyzing agent, the nature of the compounds etc. Using, for example, sodium hydroxide at 10% concentration and at a temperature of 75° to 95° C., the hydrolysis is usually completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-aminobenzenesulfonamidopyrimidines. This process involves diazotization of the p-amino-group on the benzene ring followed by decomposition of the diazo compound under carefully controlled conditions so that a hydroxy group is formed. An example of this procedure is shown in the specific examples. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, hydrobromic, phosphoric and the like may, of course, be used to replace the sulfuric, if desired.

The invention will now be illustrated by the preparation of representative p-hydroxybenzenesulfonamidopyrimidines in the following examples. All parts are by weight unless otherwise indicated.

*Example 1*

To a solution of 111 parts (0.39 mole) N-(5-chloro-2-pyrimidyl)-sulfanilamide in 1,200 parts water and 360 parts 95% sulfuric acid is added gradually, a solution of 28 parts sodium nitrite in 150 parts water, with the addition of ice as necessary to maintain the temperature at 5°–15° C. After addition of 360 parts more 95% sulfuric acid, the solution is heated to 90°–100° C. and held at this temperature for ½ hour. The product is filtered after cooling the solution to about 30° C.

Purification is effected by dissolving the crude material in 500 parts water and sufficient sodium hydroxide to bring the pH to about 9-10. There is added 150 parts sodium chloride, and the solution is cooled to 10° C. to cause crystallization of the sodium salt, which is then filtered off and washed with saturated salt solution.

The filter cake is dissolved in 2,000 parts water at 80° C., 20 parts activated charcoal is added, and the solution is clarified at 80° C. Hydrochloric acid is added to pH 3-4, the solution is cooled to about 30° C., and the product isolated by filtration.

The filter cake is dissolved in 2,000 parts 40% alcohol at 75° C. with sodium hydroxide to bring the pH to 7-7.5. After addition of 10 parts activated charcoal, the hot solution is clarified and acidified to pH 3-4. The product is filtered after cooling to 40° C., and after washing and drying there is obtained 83 parts light yellow crystalline N - (5 - chloro - 2 - pyrimidyl) - 1 - phenol-4-sulfonamide, melting at 240.5°–242.0° C.

*Example 2*

To a mixture of 58 parts (0.46 mole) 2-amino-4-methoxypyrimidine and 100 parts dry pyridine at 20° C. is added 100 parts (0.37 mole) 1-carbethoxyoxybenzene - 4 - sulfonyl chloride. The mixture warms up from the reaction and is allowed to stand several hours to complete the reaction. Four hundred parts water and enough hydrochloric acid to give a pH of 3-4 are added, and the oily precipitate, which crystallizes on standing, is filtered off.

The carbethoxy group is hydrolyzed by heating the above solid in 200 parts 2.5 N sodium hydroxide at 95°–100° C. for ½ hour. The product is precipitated by addition of hydrochloric acid to pH 3-4 and cooling.

Purification is brought about by recrystallization twice from 300 parts by volume portions of 70% ethyl alcohol, with the aid of 2 parts activated charcoal for decolorization. There is obtained 6 parts colorless crystalline N-(4-methoxy - 2 - pyrimidyl) - 1 - phenol - 4 - sulfonamide, melting at 243.9°–244.5° C.

*Example 3*

To a mixture of 100 parts dry pyridine and 50 parts 2-amino-4-methylpyrimidine is added with stirring 100 parts 1 - carbethoxyoxybenzene - 4 - sulfonyl chloride. After standing overnight, there is added 500 parts water and sufficient 36% hydrochloric acid to bring the pH to about 4. The gummy product crystallizes on standing, and is separated by filtration and purified by recrystallization from ethyl alcohol and 50% ethyl alcohol to give N - (4 - methyl - 2 - pyrimidyl) -1- carbethoxyoxybenzene - 4 - sulfonamide, practically colorless crystals melting at 190.3°–192.9° C.

A solution of 50 parts N-(4-methyl-2-pyrimidyl) - 1 - carbethoxyoxybenzene - 4 - sulfonamide in 500 parts water and 70 parts sodium hydroxide is heated to 85°–95° C. for 3 hours. On adding 100 parts sodium chloride and cooling to 10° C., there is obtained a disodium salt of N - (4 - methyl - 2 - pyrimidyl) - 1 - phenol - 4-sulfonamide. This sodium salt is dissolved in 500 parts water at 80° C., and hydrochloric acid is added until the pH is about 8. After addition of 5 parts activated charcoal and heating 15 minutes to 80°–90° C., the solution is clarified and the product is precipitated with enough hydrochloric acid to bring the pH to about 4. The solution is cooled, and the product is filtered off.

Further purification is brought about by dissolving in hot water and sodium hydroxide at pH of 8–9, treating with activated charcoal, filtering and precipitating as before. There is obtained 18.7 g. N-(4-methyl-2-pyrimidyl)-1-phenol-4-sulfonamide as practically colorless crystals melting at 224°–225.5° C.

*Example 4*

Twelve parts of 2-amino-4,6-dimethylpyrimidine are slurried in 50 volume parts of dry pyridine and 35 parts of 4-(p-toluenesulfonyloxy)-benzenesulfonyl chloride are added slowly with stirring. The temperature of the reaction mixture rises slightly and all of the solids dissolve forming a clear, lightly yellow-brown solution. This is allowed to stand at room temperature (25–30° C.) about 16 hours without further heating or stirring.

The now dark reaction mixture is poured with stirring into 1000 parts of ice water acidified with hydrochloric acid. The crude product separates in the form of a dirty yellow, slightly gummy precipitate which is filtered by suction, washed well with water and dried at 50° C. The dry crude material is a tan colored powder; weight, 32 parts. If desired, this crude product can be purified to an almost white powder having a melting range of 179.1–180.5° C. by crystallizing it from eight times its weight of ethyl alcohol using decolorizing carbon. However, this crude O-(p-toluene-sulfonyl)-N-(4 6-dimethyl-2-pyrimidyl)-1-phenol-4-sulfonamide is pure enough for use in the next step.

Eighteen parts of O-(p-toluenesulfonyl)-N-(4,6-dimethyl-2-pyrimidyl)-1-phenol-4-sulfonamide are mixed with 200 volume parts of 10% sodium hydroxide solution and the whole heated on the steam bath for 1½ hours. At first the solid turns to a dark oil but in a few minutes this dissolves forming a clear, brown solution. After the heating period the hot solution is treated with decolorizing carbon which leaves it almost colorless. The pH of this solution is then adjusted to about 4 whereupon 6 parts N-(4,6-dimethyl-2-pyrimidyl)-1-phenol-4-sulfonamide separate slowly in the form of colorless, minute, short prisms having a melting range of 194.6–195.9° C.

| Analysis | C | H | N | S |
|---|---|---|---|---|
| Calculated for $C_{12}H_{13}N_3O_3S$ | 51.6 | 4.66 | 15.05 | 11.5 |
| Found | 51.7 | 4.86 | 15.2 | 11.3 |

*Example 5*

To a mixture of 245 parts of pyridine and 123 parts of 2-amino-4,6-dimethylpyrimidine is added with stirring 300 parts of benzoyloxybenzenesulfonyl chloride holding the temperature at 15–20° C. After standing overnight, there is added 600 parts of water and sufficient 36% hydrochloric acid to bring the pH to about 4. A gummy product is obtained which is filtered, washed with water and dried at 50° C. It is ground, dissolved in 492 parts of pyridine, treated with activated carbon, filtered, and the filtrate is diluted gradually with stirring with 3500 parts of water. The solution is cooled to 5° C., filtered and the light brown crystalline product obtained is washed with 1500 parts of water. After drying at 50° C. there is obtained 233 parts N-(4,6-dimethyl-2-pyrimidyl)-1-benzoyloxybenzene-4-sulfonamide. It is dissolved in 609 parts of 20% sodium hydroxide and heated at 90–95° C. for 45 minutes; 500 parts more water is added and then 25 parts of activated carbon, and the solution is clarified. After 15 minutes further heating the slurry is filtered and the filtrate acidified to a pH of about 4 with 36% hydrochloric acid, cooled to 10° C. and again filtered. The filter cake is washed with water and dried at 50° C.

Purification is brought about by extraction with 1790 parts of ethyl ether and then reprecipitating the ether insoluble portion four times from an aqueous sodium hydroxide solution with hydrochloric acid. It is finally recrystallized from 789 parts of anhydrous ethyl alcohol with the aid of activated charcoal for decolorization. There is obtained 84 parts of N-(4,6-dimethyl-2-pyrimidyl)-1-phenol-4-sulfonamide, melting at 197.5–199.5° C.

We claim:

1. Compounds having the general formula

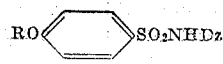

in which R is a member of the group consisting of hydrogen and acyl radicals and Dz is a pyrimidyl radical with substituents chosen from the group consisting of alkyl, aralkyl, alkoxy, halogen, amino, substituted amino, hydroxy, carboxy, and carbalkoxy radicals, and the salts of said compounds.

2. Compounds having the general formula

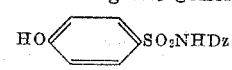

in which Dz is a pyrimidyl radical with substituents chosen from the group consisting of alkyl, aralkyl, alkoxy, halogen, amino, substituted amino, hydroxy, carboxy, and carbalkoxy radicals, and the salts of said compounds.

3. Compounds having the general formula

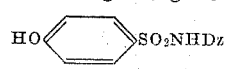

in which Dz is a pyrimidyl radical having at least one alkyl substituent thereon.

4. N-(4,6-dimethyl-2-pyrimidyl)-1-phenol-4-sulfonamide.

5. N-(4-methyl-2-pyrimidyl)-1-phenol-4-sulfonamide.

6. N-(5-chloro-2-pyrimidyl)-1-phenol-4-sulfonamide.

7. A method of preparing compounds having the general formula

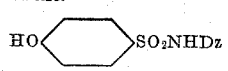

in which Dz is a pyrimidine radical with substituents chosen from the group consisting of alkyl, aralkyl, alkoxy, halogen, amino, substituted amino, hydroxy, carboxy, and carbalkoxy radicals which comprises the step of treating a compound of the formula

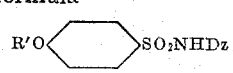

in which R' is an acyl radical with a hydrolyzing agent.

8. A method of preparing N-(4,6-dimethyl-2-pyrimidyl)-1-phenol-4-sulfonamide which comprises the step of treating N-(4,6-dimethyl-2-pyrimidyl)-1-carbethoxyoxybenzene-4-sulfonamide with a hydrolyzing agent until N-(4,6-dimethyl-2-pyrimidyl)-1-phenol-4-sulfonamide is formed and thereafter recovering the said product.

9. A method of preparing N-(4,6-dimethyl-2-pyrimidyl)-1-phenol-4-sulfonamide which comprises the step of treating N-(4,6-dimethyl-2-pyrimidyl)-1-p-toluenesulfonyloxy)benzene-4-sulfonamide with a hydrolyzing agent until N-(4,6-dimethyl-2-pyrimidyl)-1-phenol-4-sulfonamide is formed and thereafter recovering the said product.

10. A method of preparing N-(4-methoxy-2-pyrimidyl)-1-phenol-4-sulfonamide which comprises the step of treating N-(4-methoxy-2-pyrimidyl)-1-carbethoxyoxybenzene-4-sulfonamide with a hydrolyzing agent until N-(4-methoxy-2-pyrimidyl)-1-phenol-4-sulfonamide is formed and thereafter recovering the said product.

11. A method of preparing compounds having the general formula

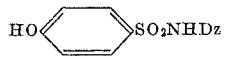

in which Dz is a pyrimidyl radical, with substituents chosen from the group consisting of alkyl, aralkyl, alkoxy, halogen, amino, substituted amino, hydroxy, carboxy, and carbalkoxy radicals which comprises treating a p-aminobenzenesulfonamidopyrimidine with nitrous acid whereby the amino radical is diazotized, decomposing the diazo group to obtain a hydroxy radical, and thereafter recovering the said product.

12. A method of preparing N-(5-chloro-2-pyrimidyl)-1-phenol-4-sulfonamide which comprises the step of treating N-(5-chloro-2-pyrimidyl)-sulfanilamide with a diazotizing agent and after diazotization of the amino radical treating the product with sulfuric acid to decompose the diazo group and thereafter recovering the said product.

MARTIN E. HULTQUIST.
YELLAPRAGADA SUBBAROW.

REFERENCES CITED

The following references are of record in the file of this patent:

Mayer, Biologie Medicale, 27, 90 (1937).
English et al., J. Am. Chem. Soc., 68, 1039–1049 (1946).
Beilstein, Vierte Auflage, vol. 11, page 243.

Certificate of Correction

Patent No. 2,535,635                                                                     December 26, 1950

MARTIN E. HULTQUIST ET AL.

It is hereby certified that error appears in the printed specification of the above numbered patent requiring correction as follows:

Column 5, line 35, for "(4 6-" read *(4,6-*; line 39, for "(4.6-" read *(4,6-*; and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*